(12) United States Patent
Leppanen et al.

(10) Patent No.: US 11,490,217 B2
(45) Date of Patent: Nov. 1, 2022

(54) AUDIO RENDERING FOR AUGMENTED REALITY

(71) Applicant: Nokia Technologies Oy, Espoo (FI)

(72) Inventors: Jussi Leppanen, Tampere (FI); Arto Lehtiniemi, Lempaala (FI); Antti Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/957,756

(22) PCT Filed: Dec. 20, 2018

(86) PCT No.: PCT/IB2018/060469
§ 371 (c)(1),
(2) Date: Jun. 25, 2020

(87) PCT Pub. No.: WO2019/130184
PCT Pub. Date: Jul. 4, 2019

(65) Prior Publication Data
US 2021/0067894 A1 Mar. 4, 2021

(30) Foreign Application Priority Data
Dec. 27, 2017 (EP) .................................. 17210633

(51) Int. Cl.
*H04S 7/00* (2006.01)
*G06F 3/01* (2006.01)
*G06F 3/16* (2006.01)
*G06T 19/00* (2011.01)

(52) U.S. Cl.
CPC .............. *H04S 7/303* (2013.01); *G06F 3/011* (2013.01); *G06F 3/165* (2013.01); *G06T 19/006* (2013.01); *H04S 2400/11* (2013.01)

(58) Field of Classification Search
CPC combination set(s) only.
See application file for complete search history.

(56) References Cited

U.S. PATENT DOCUMENTS

| | | | |
|---|---|---|---|
| 10,225,737 B1 * | 3/2019 | Mulders | H04W 12/06 |
| 10,261,672 B1 * | 4/2019 | Dolbakian | G06F 3/04817 |
| 2010/0040238 A1 | 2/2010 | Jang et al. | |
| 2013/0176248 A1 * | 7/2013 | Shin | G06F 3/0487 345/173 |
| 2013/0249947 A1 * | 9/2013 | Reitan | G06T 19/006 345/633 |
| 2016/0314624 A1 | 10/2016 | Li et al. | |

* cited by examiner

Primary Examiner — Duc Nguyen
Assistant Examiner — Assad Mohammed
(74) Attorney, Agent, or Firm — Harrington & Smith (57) ABSTRACT

A method, an apparatus and a computer program are provided. The method includes rendering visual augmented reality content for display on a display of a hand-held electronic device, based on a location of the hand-held electronic device; estimate a location of a user of the hand-held electronic device, different from the location of the hand-held electronic device; and rendering aural augmented reality content for output to the user of the hand-held electronic device, based on the location of the user.

17 Claims, 8 Drawing Sheets

AUDIO RENDERING FOR AUGMENTED REALITY

CROSS REFERENCE TO RELATED APPLICATION

This patent application is a U.S. National Stage application of International Patent Application Number PCT/IB2018/060469 filed Dec. 20, 2018, which is hereby incorporated by reference in its entirety, and claims priority to EP 17210633.8 filed Dec. 27, 2017.

TECHNOLOGICAL FIELD

Embodiments of the present invention relate to audio rendering. In particular, they relate to audio rendering for augmented reality.

BACKGROUND

Visual and aural content may be rendered for virtual or augmented reality based on six degrees of freedom (6DoF). The six degrees of freedom may relate to translational movement of a device (such as a head-mounted electronic device or a hand-held electronic device) in three dimensions in Euclidean space (x, y and z dimensions) and rotational movement about each of those dimensions (roll, pitch and yaw).

BRIEF SUMMARY

According to various, but not necessarily all, embodiments of the invention there is provided an apparatus, comprising: at least one processor; memory storing computer program code is configured, working with the at least one processor, to cause the apparatus to at least: determine a location of a hand-held electronic device; render visual augmented reality content for display on a display of the hand-held electronic device, based on the location of the hand-held electronic device; estimate a location of a user of the hand-held electronic device, different from the location of the hand-held electronic device; and render aural augmented reality content for output to the user of the hand-held electronic device, based on the location of the user.

According to various, but not necessarily all, embodiments of the invention there is provided an apparatus, comprising: means for determining a location of a hand-held electronic device; means for rendering visual augmented reality content for display on a display of the hand-held electronic device, based on a location of the hand-held electronic device; estimating a location of a user of the hand-held electronic device, different from the location of the hand-held electronic device; and means for rendering aural augmented reality content for output to the user of the hand-held electronic device, based on the location of the user.

According to various, but not necessarily all, embodiments of the invention there is provided a method, comprising: determining a location of a hand-held electronic device; rendering visual augmented reality content for display on a display of the hand-held electronic device, based on a location of the hand-held electronic device; estimating a location of a user of the hand-held electronic device, different from the location of the hand-held electronic device; and rendering aural augmented reality content for output to the user of the hand-held electronic device, based on the location of the user.

According to various, but not necessarily all, embodiments of the invention there is provided computer program code that, when executed by at least one processor of an apparatus, causes the apparatus at least to: determine a location of a hand-held electronic device; render visual augmented reality content for display on a display of the hand-held electronic device, based on a location of the hand-held electronic device; estimate a location of a user of the hand-held electronic device, different from the location of the hand-held electronic device; and render aural augmented reality content for output to the user of the hand-held electronic device, based on the location of the user.

According to various, but not necessarily all, embodiments of the invention there is provided examples as claimed in the appended claims.

The following portion of this 'Brief Summary' section, describes various features that may be features of any of the embodiments described in the foregoing portion of the 'Brief Summary' section. The description of a function should additionally be considered to also disclose any means suitable for performing that function The computer program code may be configured, working with the at least one processor, to cause the apparatus to at least: determine that the location of the hand-held electronic device is in a virtual space that is demarcated by a virtual boundary; determine that the hand-held electronic device has crossed the virtual boundary without the location of the user crossing the virtual boundary, such that the location of the hand-held electronic device is outside the virtual boundary and the location of the user is inside the virtual boundary; and continue to render aural augmented reality content associated with the virtual space for output to the user, based on the location of the user being inside the virtual boundary space.

The computer program code may be configured, working with the at least one processor, to cause the apparatus to at least: determine that the location of the user has crossed the virtual boundary, such that the location of the hand-held electronic device is outside the virtual boundary; and alter the rendering of aural augmented reality content in response to determining that the user has crossed the virtual boundary.

Alternating the rendering of aural augmented reality content may comprise: transitioning, from an audio signal emanating from a virtual source in the first virtual space being output to the user, to that audio signal no longer being output to the user or that audio signal being output to the user at a lower volume.

The aural augmented reality content rendered based on the location of the user may be output simultaneously with display of the visual augmented reality content rendered based on the location of the hand-held electronic device. The aural augmented reality content may be output to the user via the hand-held electronic device.

The location of the user may be estimated based at least in part on a location of the hand-held electronic device. The location of the user may be estimated at least in part by assuming that the location of the user is a fixed distance from the location of the hand-held electronic device.

The location of the user may be estimated at least in part by sensing a location of the user using at least one sensor of the hand-held electronic device. The at least one sensor may comprise an image sensor, and the location of the user may be estimated by analyzing visual data of the user provided by an image sensor of the hand-held electronic device.

The computer program code may be configured, working with the at least one processor, to cause the apparatus to at least: transition, based at least in part on user step detection, from rendering aural augmented reality content based on the location of the user to rendering the aural augmented reality content based on the location of the hand-held electronic device. The user step detection may be based on inputs provided by at least one motion sensor of the hand-held electronic device.

The apparatus may be the hand-held electronic device.

BRIEF DESCRIPTION

For a better understanding of various examples that are useful for understanding the detailed description, reference will now be made by way of example only to the accompanying drawings in which.

DEFINITIONS

The following definitions apply in this document:

a "point of view" is a perspective from a particular location and a particular orientation in space;

"artificial environment" may be something that has been recorded or computer generated;

"virtual visual space" refers to a fully or partially artificial environment that may be viewed, which may be three-dimensional;

"virtual visual scene" refers to a representation of the virtual visual space viewed from a particular point of view within the virtual visual space;

'virtual visual object' is a visible virtual object within a virtual visual scene;

"virtual aural space" refers to an arrangement of virtual audio sources in a three-dimensional space;

"virtual aural scene" refers to a representation of the virtual aural space listened to from a particular point of view within the virtual aural space;

"virtual aural object" refers to a virtual audio source that may be located within the virtual aural space;

"virtual space" may mean a virtual visual space, mean a virtual aural space or mean a combination of a virtual visual space and corresponding virtual aural space. In some examples, the virtual space may extend horizontally up to 360° and may extend vertically up to 180°;

"virtual scene" may mean a virtual visual scene, mean a virtual aural scene or mean a combination of a virtual visual scene and corresponding virtual aural scene;

'virtual object' is an object within a virtual scene, it may be an artificial virtual object (e.g. a computer-generated virtual object) or it may be an image of a real object in a real space that is live or recorded. It may be a virtual aural object and/or a virtual visual object;

"correspondence" or "corresponding" when used in relation to a real space, a virtual aural space and a virtual visual space means that the real space, the virtual aural space and virtual visual space are time and space aligned, that is they are the same space at the same time;

correspondence" or "corresponding" when used in relation to a virtual aural scene and a virtual visual scene means that the virtual aural space and virtual visual space are corresponding and the point of view which defines the virtual aural scene and the virtual visual scene are at the same virtual location and virtual orientation;

"real space" (or "physical space") refers to a real environment, which may be three dimensional;

"real scene" refers to a representation of the real space from a particular point of view within the real space;

"real visual scene" refers to a visual representation of the real space viewed from a particular real point of view within the real space;

"augmented reality" in this document refers a user experiencing a partially artificial environment. The partially artificial environment is defined by both a virtual space and a real space. In some circumstances, a hand-held electronic device renders the virtual space such that only the virtual space (and not the real space) is experienced via the hand-held electronic device but, as the user's field of view extends beyond the virtual visual scene displayed by the hand-held electronic device, the user experiences both the virtual space and the real space. In other circumstances, the hand-held electronic device provides a "see-through capability" in which aspects of the real world can be experienced via the hand-held electronic device along with the virtual scene;

"displaying" means providing in a form that is perceived visually (viewed) by a user; and "rendering" data means processing data for provision to a user so that it is perceived by the user.

DETAILED DESCRIPTION

Embodiments of the invention relate to rendering visual and audio content for augmented reality. Visual augmented reality content is rendered based on a location of the hand-held electronic device, whereas aural augmented reality content is rendered based on a location of the user. The location of the user is different from the location of the hand-held electronic device, and may be estimated from the location of the hand-held electronic device.

Aural augmented reality content may be rendered differently depending upon whether the user is located inside a virtual room or outside the virtual room. For example, if a user is located inside the virtual room, the aural augmented reality content may be audible to the user, whereas if the user is located outside the virtual room, the aural augmented reality content may be inaudible to the user.

By rendering aural augmented reality content based on a location of the user, rather than a location of the hand-held electronic device, it is possible to avoid a situation in which the aural augmented reality content is erroneously rendered when the user and the hand-held electronic device are located either side of a virtual boundary of a virtual room. For example, if the user is located inside the virtual room but the hand-held electronic device is located outside the virtual room, the aural augmented reality content is rendered based on the user having a location inside the virtual room (rather than based on the location of the hand-held electronic device outside the virtual room).

Figure 1:
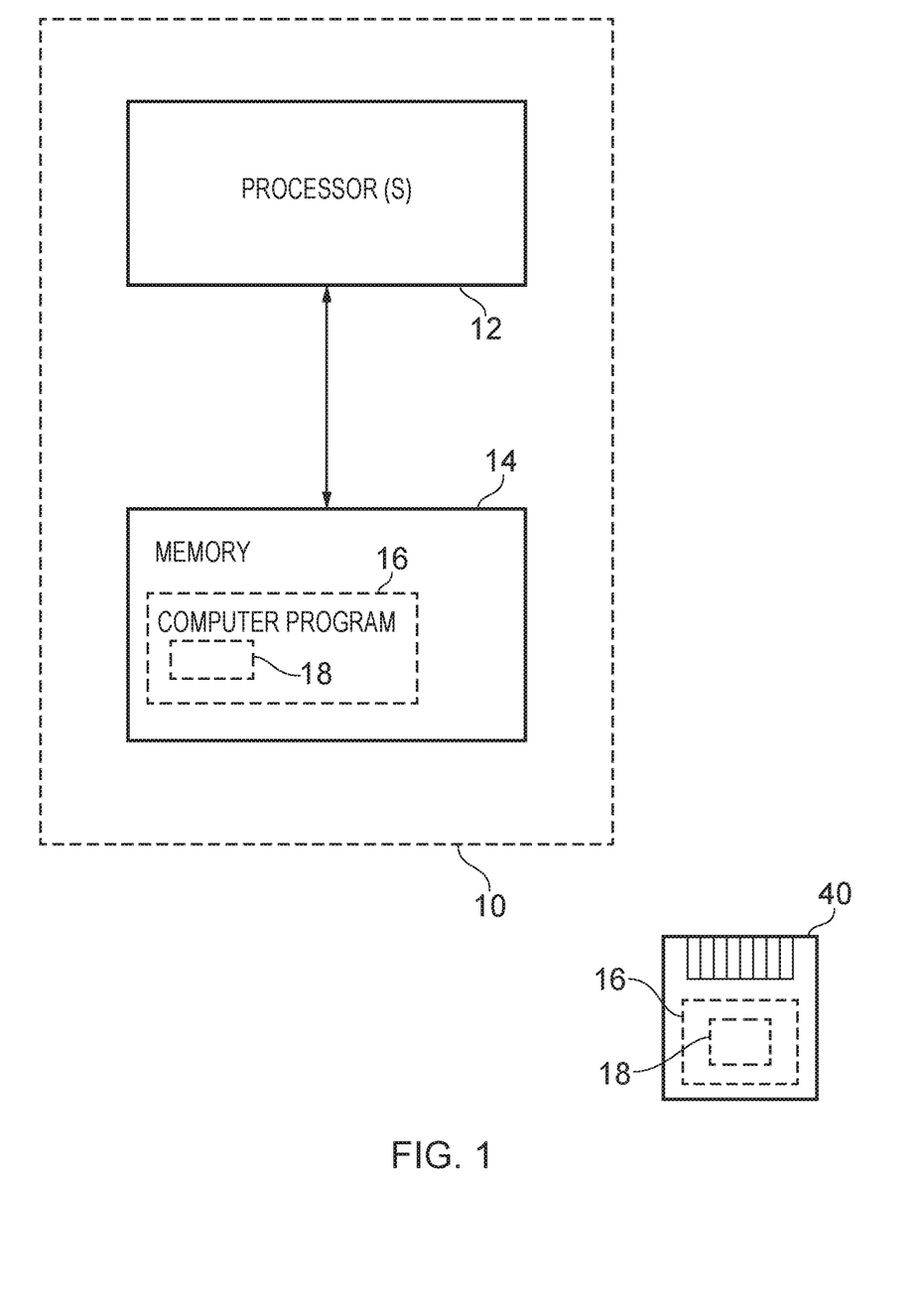
FIG. 1 illustrates an apparatus in the form of a chip or chipset.

FIG. 1 illustrates an apparatus 10 which may, for example, be a chip or a chipset. The apparatus 10 comprises at least one processor 12 and memory 14.

Figure 2:
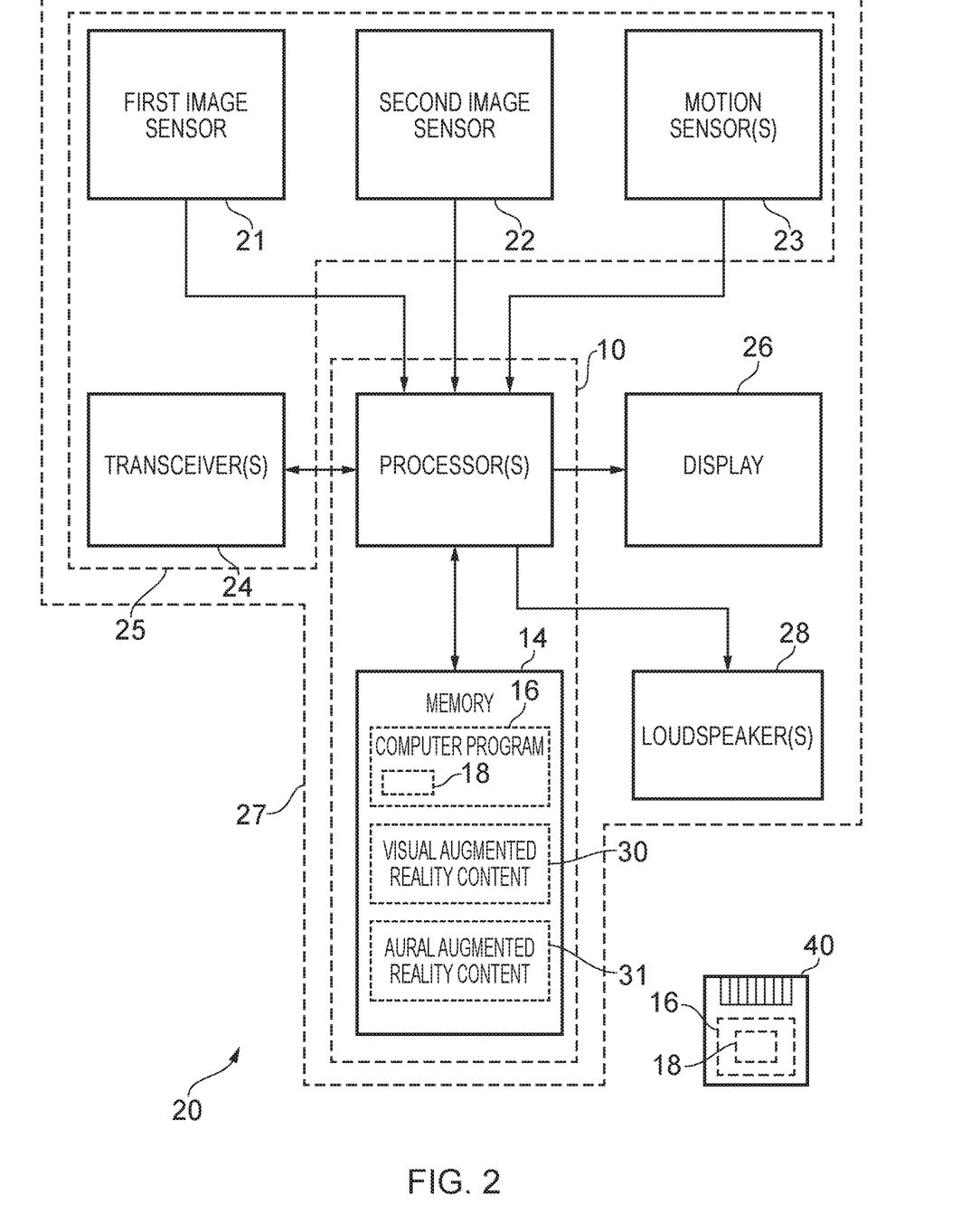
FIG. 2 illustrates a further apparatus in the form of a hand-held electronic device.

FIG. 2 illustrates a further apparatus 20 which may, for example, be a hand-held electronic device. The hand-held electronic device 20 may, for example, be a mobile telephone or a tablet computer. The hand-held electronic device 20 comprises the apparatus 10 illustrated in FIG. 1.

Although the processor 12 is illustrated as a single component/circuitry it may be implemented as one or more separate components/circuitry some or all of which may be integrated/removable. The processor 12 may be a single core or multi-core processor.

The processor 12 is configured to read from and write to the memory 14. The processor 12 may also comprise an output interface via which data and/or commands are output by the processor 12 and an input interface via which data and/or commands are input to the processor 12.

Although the memory 14 is illustrated as a single component/circuitry it may be implemented as one or more separate components/circuitry some or all of which may be integrated/removable and/or may provide permanent/semi-permanent/dynamic/cached storage.

The memory 14 is illustrated in FIGS. 1 and 2 as storing a computer program 16 comprising computer program code/instructions 18 that controls the operation of the apparatus 10 when loaded into the processor 12. The computer program instructions 18, of the computer program 16, provide the logic and routines that enables the apparatuses 10, 20 to perform the method illustrated in FIG. 5. The processor 12, by reading the memory 14, is able to load and execute the computer program 16.

As illustrated in FIGS. 1 and 2, the computer program 16 may arrive at the apparatus 20 via any suitable delivery mechanism 40. The delivery mechanism 40 may be, for example, a non-transitory computer-readable storage medium, a computer program product, a memory device, a record medium such as a compact disc read-only memory (CD-ROM) or digital versatile disc (DVD), or any other an article of manufacture that tangibly embodies the computer program 16. The delivery mechanism 40 may be a signal configured to reliably transfer the computer program 16. The further apparatus 20 may propagate or transmit the computer program 16 as a computer data signal.

In addition to the processor 12 and the memory 14, the further apparatus/hand-held electronic device 20 comprises a first image sensor 21, a second image sensor 22, one or more motion sensors 23, one or more transceivers 24, at least one display 26 and one or more loudspeakers 28. Each of these elements, 12, 14, 21, 22, 23, 24, 26 may be housed by a housing 27 of the hand-held electronic device 20.

The first and second image sensors 21, 22 are configured to provide inputs, in the form of image/visual data, to the processor 12 for processing.

The first image sensor 21 may, for example, be mounted in the housing 27 of the hand-held electronic device 20 as a rear facing image sensor. The second image sensor 22 may, for example, be mounted in the housing 27 of the hand-held electronic device 20 as a front facing image sensor.

One or both of the image sensors 21, 22 may, for example, be a semiconductor charge-coupled device (CCD), a complementary metal-oxide-semiconductor (CMOS) sensor, an n-type metal-oxide-semiconductor (NMOS) or any other type of image sensor.

The one or more motion sensors 23 may, for example, include one or more accelerometers and one or more gyroscopes. The one or more motion sensors 23 are configured to provide inputs, in the form of motion data, to the processor 12 for processing.

The one or more transceivers 24 may include one or more radio frequency transceivers. In some embodiments, the one or more radio frequency transceivers 24 may include one or more Bluetooth transceivers, one or more WiFi (Institute of Electrical and Electronic Engineers 802.11) transceivers and/or one or more cellular transceivers. The one or more radio frequency transceivers 24 may be configured to enable the location of the hand-held electronic device 20 to be determined, for example as part of an indoor positioning system.

The one or more transceivers 24 are configured to provide inputs, in the form of data from other apparatuses, to the processor 12. The one or more transceivers 24 are also configured to transmit data, received from the processor 12, to other apparatuses.

In some embodiments, the hand-held electronic device 20 might include satellite positioning circuitry that is configured to determine the location of the hand-held electronic device 20. Such satellite positioning circuitry may be compatible with the Global Positioning System (GPS).

The first image sensor 21, second image sensor 22, the one or more motion sensors 23, the transceivers 24 and the satellite positioning circuitry can be considered, both individual and collectively, to be sensing circuitry 25.

The display 26 is controlled by the processor 12 to display visual information to a user of the hand-held electronic device 20. The display 26 may be any type of display, including a liquid crystal display (LCD) device, an organic light emitting diode (OLED) display device and a quantum dot display device.

The one or more loudspeakers 28 are controlled by the processor 12 to output audio to the user. In the illustrated example, the loudspeaker(s) 28 is/are located within the housing 27 of the hand-held electronic device 20. Alternatively or additionally, the one or more loudspeakers 28 might be external to the housing 27 and might or might not be contained within a headset (in the form of headphones, for example). In this regard, the loudspeaker(s) 28 might not form part of the hand-held electronic device 20. The one or more transceivers 24 might provide a data connection between the hand-held electronic device 20 and an external device, such as a headset, comprising the one or more external loudspeakers 28.

The memory 14 in FIG. 2 is illustrated as storing visual augmented reality content 30 and aural augmented reality content 31. The visual augmented reality content 30 and aural augmented reality content 31 correspond to each other in that they relate to the same virtual space and the same real space.

The visual augmented reality content 30 comprises content that may be rendered by the processor 12 for display on the display 26 of the hand-held electronic device 20. For example, virtual visual scenes of a virtual visual space may be rendered from the visual augmented reality content 30. The visual augmented reality content 30 may, for example, define virtual visual objects in a virtual visual space.

The aural augmented reality content 31 comprises content that may be rendered by the processor 12 for output by the loudspeaker(s) 28. For example, a virtual aural scene of a virtual aural space may be rendered from the aural augmented reality content 31. The aural augmented reality content 31 may, for example, define virtual aural objects in a virtual aural space. The virtual aural space corresponds with the virtual visual space mentioned above in relation to the visual augmented reality content 30.

The elements 12, 14, 21, 22, 23, 24, 26, 28 of the hand-held electronic device 20 are operationally coupled and any number or combination of intervening elements can exist (including no intervening elements).

Figure 3A:
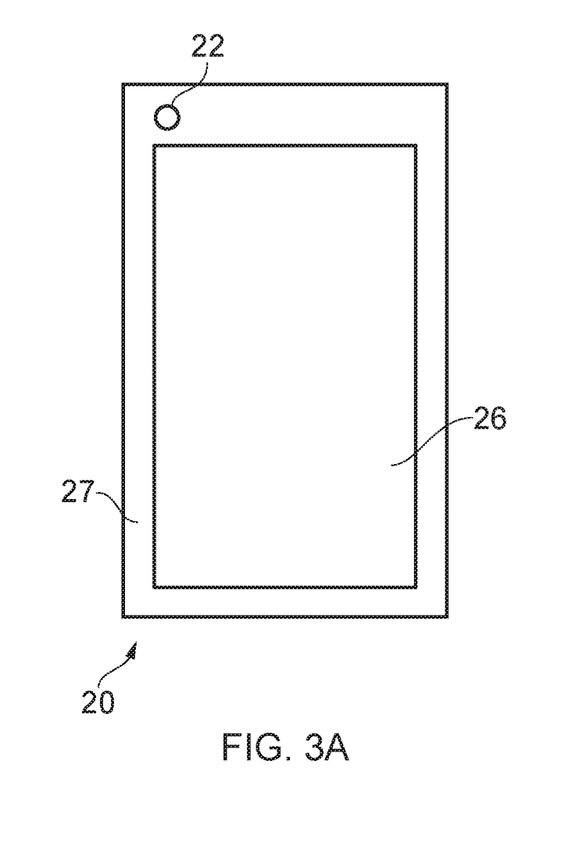
FIG. 3A illustrates a front elevation of the hand-held electronic device.
Figure 3B:
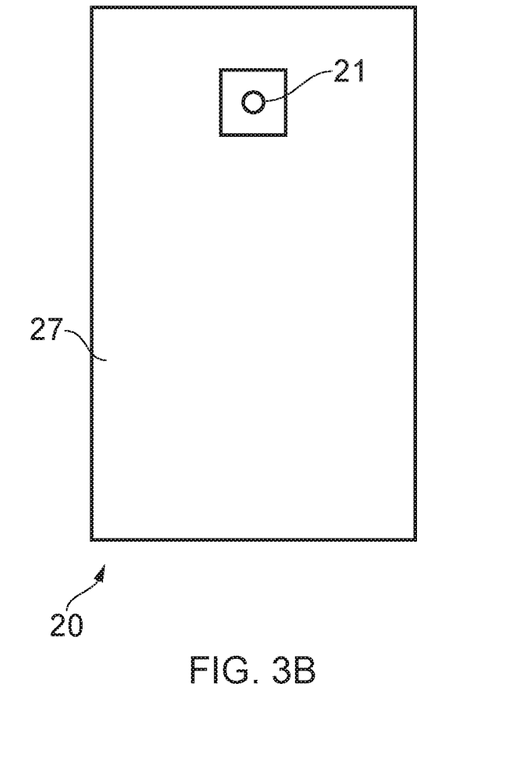
FIG. 3B illustrates a rear elevation of the hand-held electronic device.

FIG. 3A illustrates a front face of an example of the hand-held electronic device 20. The display 26 is located on the front face and the front facing image sensor 22 is arranged to capture images via the front face. FIG. 3B illustrates a rear face of the example of the hand-held electronic device 20. The rear facing image sensor 22 is arranged to capture images via the rear face.

Figure 4:
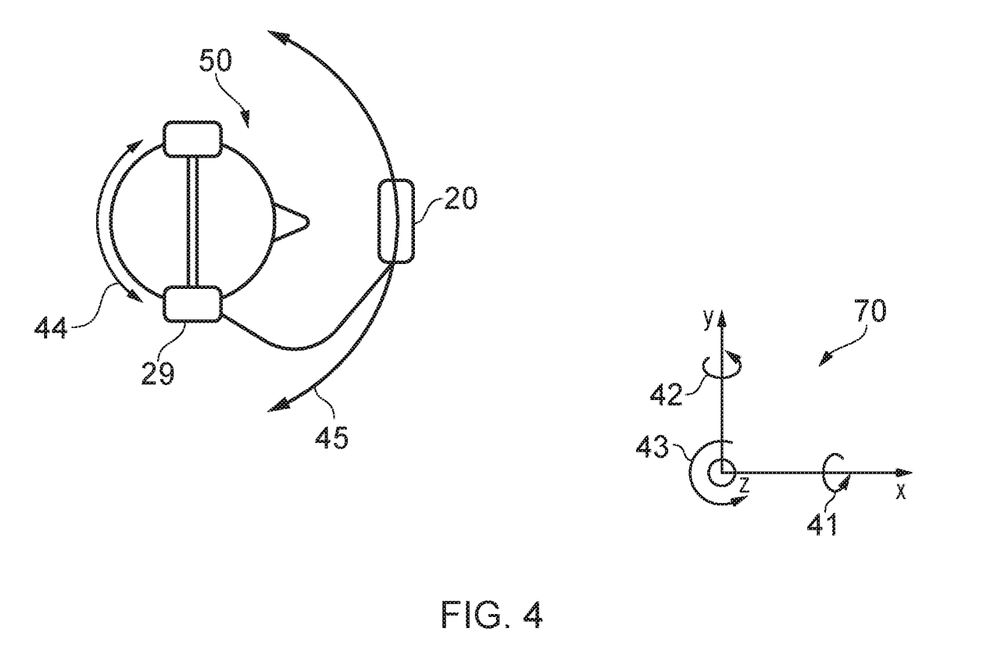
FIG. 4 illustrates a user holding the hand-held electronic device.

FIG. 4 illustrates a user 50 holding the hand-held electronic device 20. In this example, the visual augmented reality content 30 is output via the display 26 of the hand-held electronic device 20 and the aural augmented reality content 31 is output via loudspeakers 28 which form part of a headset 29 worn by the user 50.

The user holds the hand-held electronic device 20 in front of him, such that it is spaced from his eyes. The location of the user 50 is considered to correspond with the location of the user's head/eyes, which, along with the orientation of the user's head and eyes, define the user's perspective/point of view. The location of the hand-held electronic device 20 is considered to be different from the location of the user 50 because it is spaced from the user's eyes.

FIG. 4 illustrates Cartesian co-ordinate axes which define a Euclidean space using x, y and z axes. Each of the x, y and z axes defines a dimension along which translational movement of the user 50 and/or the hand-held electronic device 20 may occur. Rotational movement may also occur about the x, y and z axes. Rotational movement about the x axis is "roll" 41, rotational movement about the y axis is "pitch" 42 and rotational movement about the z axis is "yaw" 43. Movement in each of x, y, z dimensions and roll, pitch and yaw collectively define six degrees of freedom (6DoF) of movement.

The arrow labelled with the reference numeral 44 illustrates the user 50 rotating his head while moving the hand-held electronic device 20 in an arc, in order to experience the visual augmented reality content 30 displayed on the display 26 of the hand-held electronic device 20. It can be seen in FIG. 4 that the movement arc of the hand-held electronic device 20 is appreciably greater than user's head, due to the spacing between the user's eyes and the hand-held electronic device 20.

Figure 5:
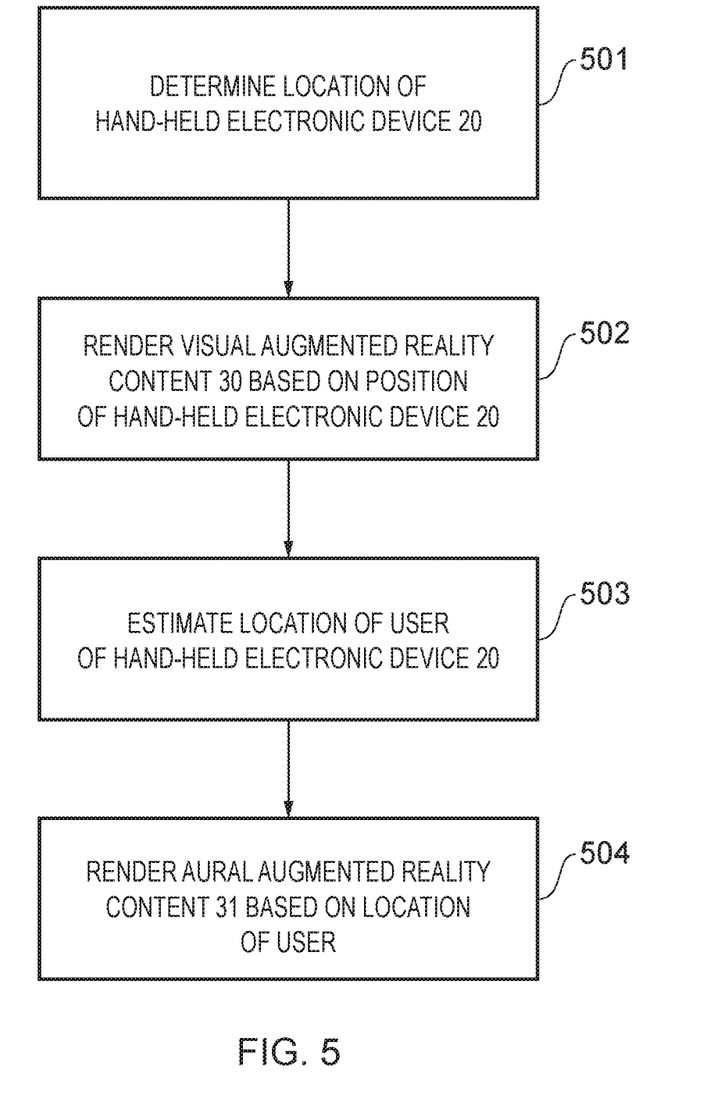
FIG. 5 illustrates a block diagram of a method.

FIG. 5 illustrates a block diagram of a method of rendering the visual and aural augmented reality content 30, 31. The method is performed by the processor 12 of the hand-held electronic device 20.

In block 501 in FIG. 5, the processor 12 determines the location of the hand-held electronic device 20. This may be done, for example, by using inputs from the one or more transceivers 24 or satellite positioning circuitry of the hand-held electronic device 20. In block 502 in FIG. 5, the processor 12 of the hand-held electronic device 20 renders the visual augmented reality content 30 for display on the display 26 of the hand-held electronic device 20, based on the determined location of the hand-held electronic device 20.

In block 503, the processor 12 estimates the location of the user 50 holding the hand-held electronic device 20. The location of the user 50 may be estimated based at least in part on the determined location of the hand-held electronic device 20. The location of the user 50 might be estimated, for example, by assuming that the location of the user 50 is a fixed location from the hand-held electronic device 20 (and possibly also a fixed orientation from the hand-held electronic device 20). The fixed distance might be in the region of 40 cm.

Alternatively, the location of (the head/face/eyes of) the user 50 might be estimated by sensing a location of the hand-held electronic device 20. The front face of the hand-held electronic device 20 could, for instance, incorporate a proximity sensor for sensing the distance from the handheld electronic device 20 to the user's face/eyes, or visual data provided by the front facing image sensor 22 could be analyzed to estimate that distance. The location of the user could then be estimated from the determined location of the hand-held electronic device 20.

In block 502 in FIG. 5, the processor 12 renders the aural augmented reality content 31 for output to the user 50 of the hand-held electronic device 20 based on the estimated location of the user 50.

The aural augmented reality content 31 rendered based on the location of the user 50 may be output simultaneously with the display of the visual augmented reality content 30 rendered based on the location of the hand-held electronic device 20.

Figure 6:
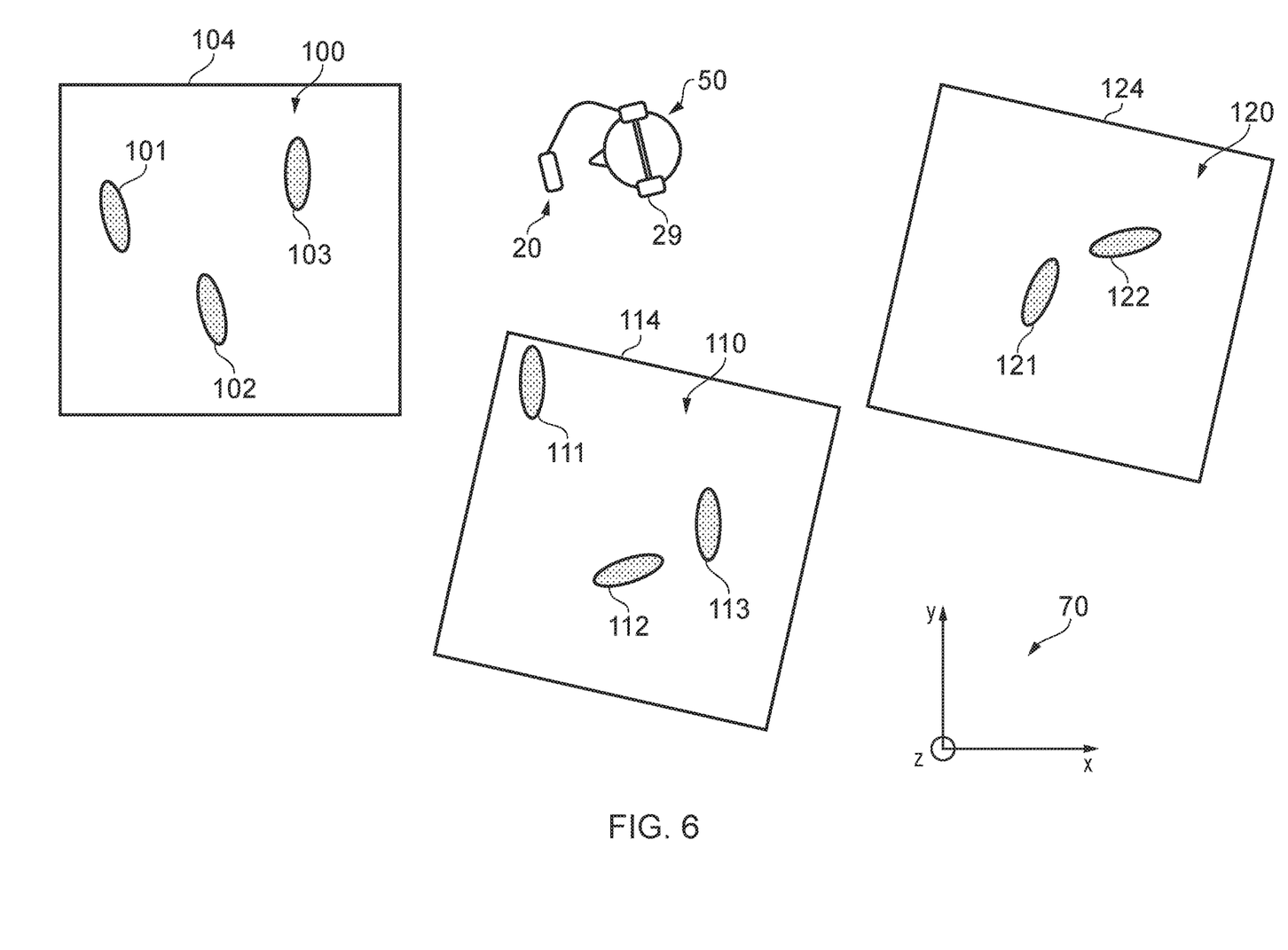
FIG. 6 illustrates a plan view of three different virtual spaces/rooms located in a wider virtual space, where each virtual room has its own visual and aural augmented reality content.

FIG. 6 illustrates a plan view of a user 50 travelling between three different virtual spaces/rooms 100, 110, 120 located in different parts of a wider virtual space. That is, each virtual space/room 100, 110, 120 is a subspace of the wider virtual space and is wholly contained within the wider virtual space. Each point in the wider virtual space corresponds with a point in real space.

The wider virtual space and the virtual spaces/rooms 100, 110, 120 have two virtual aspects to them: a virtual visual space and a virtual aural space. That is, the wider virtual space includes a wider virtual visual space and a wider virtual aural space, and each of the virtual spaces/rooms 100, 110, 120 comprises a different subspace of the wider virtual visual space and a different subspace of the wider virtual aural space.

The user 50 is holding the hand-held electronic device 20 in FIG. 6. The display 26 of the hand-held electronic device 20 displays the visual augmented reality content 30, acting as a viewfinder into the virtual visual space. At any one instance in time, the display 26 may provide a representation of the virtual visual space, in the form of a displayed a virtual visual scene, based on the perspective/point of view of the hand-held electronic device 20 (which is defined by location and orientation of the hand-held electronic device 20 in the virtual visual space).

The processor 12 renders the visual augmented reality content 30 based on the perspective/point of view of the hand-held electronic device 20. Each virtual visual scene that is displayed on the display 26 can be considered to be "third person perspective-mediated" because it is the perspective/point of view of the hand-held electronic device 20 (in real space and virtual space) that determines the virtual visual scene that is presented on the display 26 and not the user's point of view (in real space and virtual space). As the perspective/point of view of the hand-held electronic device 20 changes (in real space and virtual space), the displayed virtual visual scene changes.

The user 50 is wearing a headset 29 comprising loudspeakers 28 in FIG. 6, which output the aural augmented reality content 31 to the user 50 after it has been rendered by the processor 12. At any one instance in time, the loudspeakers 28 may provide a representation of the of the virtual aural space, in the form of a virtual aural scene, based on the point of view of the user 50 by conveying audio signals to the user 50.

The processor 12 renders the aural augmented reality content 31 based on the perspective/point of view of the (head of the) user 50. Each virtual aural scene that is output by the loudspeakers 28 can be considered to be "first person perspective-mediated" because it is the perspective/point of view of the (head of the) user 50 (in real space and virtual space) that determines the virtual aural scene that is conveyed by the loudspeakers 28 and not the perspective/point of view of the hand-held electronic device 20. As the perspective/point of view of the user 50 changes (in real space and virtual space), the conveyed virtual aural scene changes.

The audio may be conveyed to the user 50 as positional audio, such that the user 50 is able to identify the location in virtual space of each virtual aural object in a virtual aural scene by listening to it.

A first virtual room 100 is demarcated by a first virtual boundary 104. A second virtual room 110 is demarcated by a second virtual boundary 114. A third virtual room 120 is demarcated by a third virtual boundary 124. Each of the first, second and third virtual boundaries 104, 114, 124 is defined by the visual augmented reality content 30 and/or the aural augmented reality content 31. Each virtual boundary 104, 114, 124 might or might not be represented by one or more virtual visual objects such that it is visible to the user 50 in a virtual visual scene.

In the illustrated example, a first plurality of virtual objects 101, 102, 103 is present in the first virtual room 100, a second plurality of virtual objects 111, 112, 113 is present in the second virtual room 110 and a third plurality of virtual objects 121, 122 is present in the third virtual room 120. Each virtual object 101-103, 111-113, 121-122 has its own virtual location in the virtual space. More or fewer virtual objects 101-103, 111-113, 121, 122 might be present in each virtual room 100, 110, 120 than those illustrated in FIG. 6.

In this example, each virtual object 101-103, 111-113, 121, 122 comprises a virtual visual object and a corresponding virtual aural object. It might be, for instance, that the virtual visual object for each one of the virtual objects 101-103, 111-113, 121, 122 is a depiction of a virtual loudspeaker that enables the user 50 to locate the virtual objects in the virtual space visually using the display 26. In other examples, each virtual object 101-103, 111-113, 121, 122 might consist of a virtual aural object such that it cannot be seen by the user 50 in the virtual space.

In some implementations, there are no virtual visual objects (i.e. no virtual visual content) located outside the virtual rooms 100, 110, 120. In this example, the space located outside each of the virtual rooms 100, 110, 120 (in which the user 50 is located in FIG. 6) is also considered to be "virtual space" because one or more virtual objects of the virtual rooms 100, 110, 120 are visible and/or audible to the user 50 outside the virtual rooms 100, 110, 120.

In FIG. 6, the user 50 is holding the hand-held electronic device 20 such that the rear face of the hand-held electronic device 20 is pointing towards the first virtual room 100. The virtual scene based on the perspective of the hand-held electronic device 20 in FIG. 6 might show a virtual visual object depicting the virtual boundary 104 and virtual visual objects depicting the virtual objects 101, 102, 103 in the first virtual room 100.

The appearance of virtual visual objects representing the virtual objects 101-103, 111-113, 121-122 in the virtual rooms 100, 110, 120 may be filtered such that they are depicted with an aspect of transparency or depicted as wireframes when the user 50 is located outside the virtual room 100, 110, 120 in which the virtual objects 101-103, 111-113, 121-122 are present in FIG. 6.

The user 50 is able to change the point of view/perspective that the hand-held electronic device 20 has of the virtual visual space (defined by the location and orientation of the hand-held electronic device 20 in the virtual visual space) to alter the virtual visual scene that is depicted on the display 26 to see aspects of the second and third virtual rooms 110, 120 and the content within them if he wishes.

In this example, the virtual aural objects of each of the virtual objects 101-103, 111-113, 121-122 are inaudible if the user 50 if not located in the virtual room 100, 110, 120 in which the relevant virtual object 101-103, 111-113, 121-122 is located. That is, an audio signal does not emanate from those virtual objects 101-103, 111-113, 121-122 in the virtual aural scene if the user 50 is not located in the relevant virtual room 100, 110, 120. Thus, in FIG. 6, the user 50 cannot hear any of the virtual aural objects located in the virtual rooms 100, 110, 120. If the user 50 enters the first virtual room 100, the virtual aural objects forming (at least part of) the virtual objects 101-103 may become audible to the user 50 (possibly in response to user input from the user 50 at the hand-held electronic device 20).

In other examples, each virtual aural object might be audible to the user 50 at a lower volume outside the virtual room 100, 110, 120 in which the virtual aural object is located than inside that virtual room 100, 110, 120. In such examples, the aural augmented reality content 31 is rendered differently by the processor 12 based on whether the location of the user 50 is inside or outside from the relevant virtual room 100, 110, 120.

Figure 7:
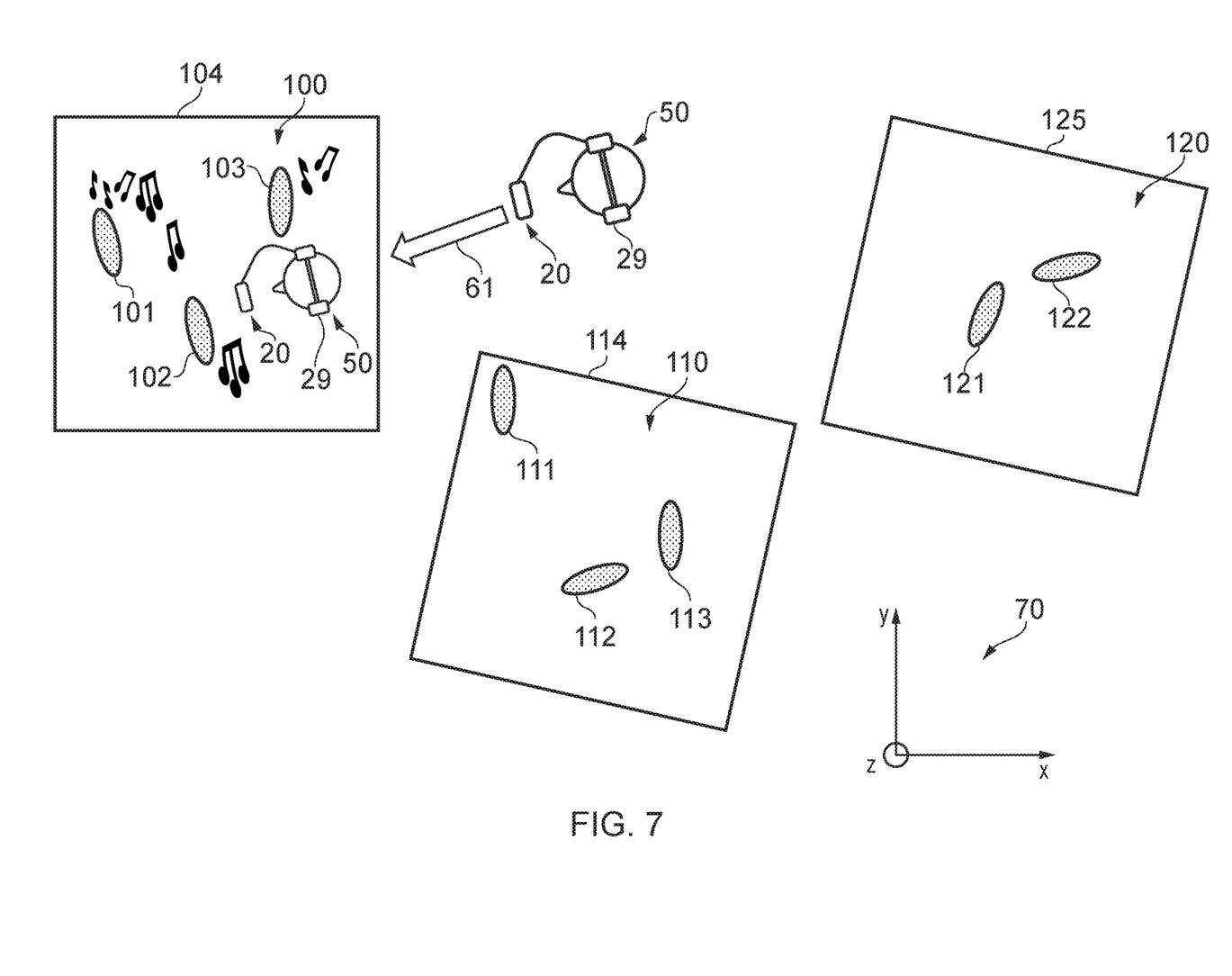
FIG. 7 illustrates the user moving in real and virtual space to enter a first one of the virtual rooms.

In FIG. 7, the user 50 walks in both real space and virtual space, crossing the virtual boundary 104 into the first virtual room 100, as illustrated by the arrow labelled with the reference numeral 61. The hand-held electronic device 20 also crosses the virtual boundary 104 into the first virtual room 100.

The processor 12 is continually monitoring the location of the hand-held electronic device 20 and the user 50. It continually renders the visual augmented reality content 30 based on the location of the hand-held electronic device 20, and continually renders the aural augmented reality content 31 based on the location of the user 50.

Prior to the user movement depicted in FIG. 7, the processor 12 determines that the location of the hand-held electronic device 20 and the location of the user 50 are both not in the first virtual room 100 demarcated by the first virtual boundary 104.

In this example, upon the hand-held electronic device 20 crossing the virtual boundary 104, the processor 12 alters the virtual scene. As explained above, the virtual scene includes both a virtual visual scene and a virtual aural scene. The visual augmented reality content 30 providing the virtual visual scene continues to be rendered by the processor 12 based on the location of the hand-held electronic device 20, the processor 12 changes how the virtual visual objects visually depicting the virtual objects 101, 102, 103 are rendered, such that they are shown unfiltered without the aspect of transparency or wireframing mentioned above, because the user 50 is now in the first virtual room 100.

The aural augmented reality content 31 continues to be rendered by the processor 12 based on the location of the user 50. If the virtual objects 101-103, 111-113, 121-122 are inaudible to the user 50 when the user 50 is outside the first virtual room 100, they may become audible to the user 50 when the user 50 crosses the virtual boundary 104 into the first virtual room 100. Alternatively, if the virtual objects 101-103, 111-113, 121-122 are audible to the user 50 when the user 50 is outside the first virtual room 100, the volume of each of the virtual objects 101-103, 111-113, 121-122 may increase when the user 50 crosses the virtual boundary 104 into the first virtual room 100.

Figure 8A:
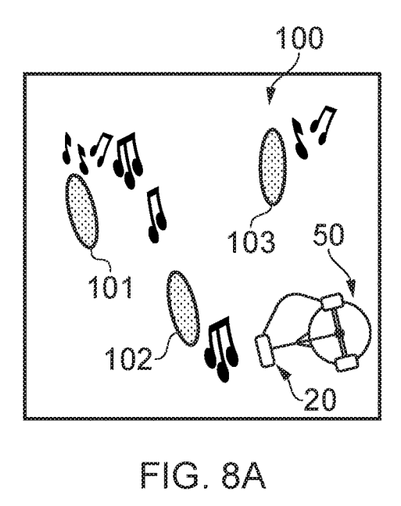
FIGS. 8A to 8C illustrate the user rotating in real and virtual space, such that the hand-held electronic device exits and then re-enters the first virtual room.

FIG. 8A illustrates a situation in which both the user 50 and the hand-held electronic device 20 are located within the first virtual room 100, as is the case in the situation illustrated in FIG. 7. The user 50 then moves, as illustrated by the arrow 62 in FIG. 8B, such that the user 50 is located within the first virtual room 100, but the hand-held electronic device 20 is located outside the first visual room 100.

Figure 8B:
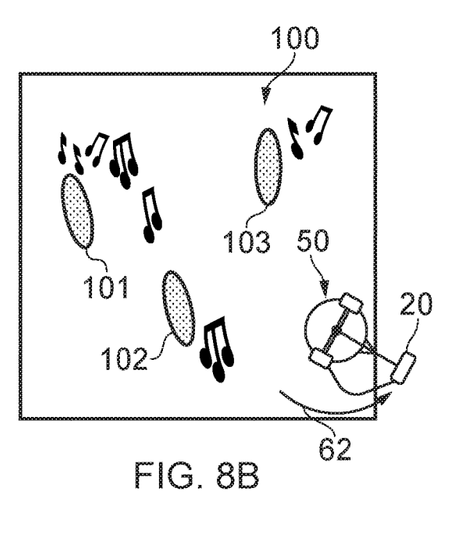

As mentioned above, the processor 12 is continually monitoring the location of the hand-held electronic device 20 and the user 50. It continually renders the visual augmented reality content 30 based on the location of the hand-held electronic device 20, and continually renders the aural augmented reality content 31 based on the location of the user 50.

In the situation illustrated in FIG. 8B, the processor 12 determines that the location of the hand-held electronic device 20 has crossed the virtual boundary 104 demarcating the first virtual room 100 without the location of the user 50 crossing the virtual boundary 104, such that the hand-held electronic device 20 is outside the virtual room 100 and the location of the user 50 remains inside the virtual room 100. The user 50 and the hand-held electronic device 20 are now in different virtual spaces which are demarcated by the virtual boundary 104, one of the virtual spaces being the first virtual room 100 and another virtual space being outside the first virtual room 100.

The processor 12 continues to render the visual augmented reality content 30 based on the location of the hand-held electronic device 20 and to render the aural augmented reality content 31 based on the location of the user 50. If the processor 12 were instead rendering the aural augmented reality content 31 based on the location of the hand-held electronic device 20, the virtual aural objects located within the first virtual room would become inaudible (or, in other examples, their volumes would be altered/reduced). This would result in a disorientating experience for the user 50, because he is still located within the first virtual room 100, even though the hand-held electronic device 20 is not. However, this disorientating experience need not occur in embodiments of the present invention.

Figure 8C:
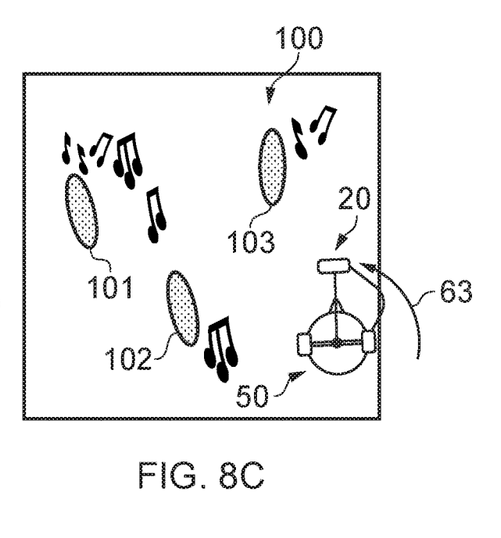

The user 50 moves from the location illustrated in FIG. 8B to the location illustrated in FIG. 8C, as illustrated by the arrow 63 in FIG. 8C, such that the user 50 and the hand-held electronic device are both again located within the first virtual room 100. The aural augmented reality content 31 continues to be rendered by the processor 12 based on the location of the user 50. The virtual aural scene that is rendered by the processor 12 and output by the loudspeaker(s) 28 includes a virtual aural object of each virtual object 101, 102, 103, such that each one of the virtual aural objects is audible to the user 50.

In some circumstances, location of the user 50 and location of the hand-held electronic device 20 might both cross the virtual boundary 104, such that they both exit the first virtual room 100. For example, from his location in FIG. 8B, the user 50 might walk across the virtual boundary 104 and out of the first virtual room 100. In such an instance, the processor 12 determines that the location of the user has crossed the virtual boundary 104, such that the location of the user 50 is outside the first virtual room 100. In response, the processor 12 ceases or alters the rendering of the aural augmented reality content 31. For instance, the virtual aural objects located within the first virtual room 100 become inaudible or their volumes are altered/reduced. That is, an audio signal no longer emanates from each of the virtual objects 101-103 located in the first virtual room 100 when the user 50 is not located in the first virtual room 100, 110, 120, or the volume of each of those audio signals is reduced.

In the above example, when the user 50 and the hand-held electronic device 20 exit the first virtual room 100, the location of the user 50 crosses the virtual boundary 104 prior to the location of the hand-held electronic device 20. It is, of course, possible that in other examples that the location of the user 50 crosses the virtual boundary 104 at the same time as, or prior to, the location of the hand-held electronic device 20.

In some implementations, the computer program code 18 is configured to cause the processor 12 to detect and track the user's steps based on inputs from the at least one motion sensor 23. In such implementations, in response to user step detection, the processor 12 may transition from rendering the aural augmented reality content 31 based on the location of the user 50 to rendering the aural augmented reality content 31 based on the location of the hand-held electronic device 20. It might be that the processor 12 transitions from rendering the aural augmented reality content 31 based on the location of the user 50 to rendering the aural augmented reality content 31 based on the location of the hand-held electronic device 20 in response to detecting that the user 50 has taken a threshold number of steps.

A detection that the user is making steps indicates that movement of the hand-held electronic device 20 is not due to the user 50 rotating on the spot (as shown in FIGS. 8A to 8C), but translation movement of the user 50, meaning that a situation where the user 50 remains inside a virtual room 100, 110, 120 while the hand-held electronic device 20 exits and then re-enters the virtual room 100, 110, 120 might be unlikely to happen. Rendering the aural augmented reality content 31 based on the location of the hand-held electronic device 20 might save power because there is no need for the location of the user 50 to be continually estimated.

Figure 8D:
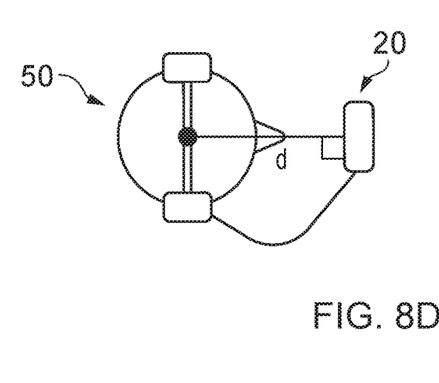
FIG. 8D illustrates a relationship between a location of the hand-held electronic device and a location of the user.

FIG. 8D illustrates an example of how the location of the user 50 may be estimated from the location of the hand-held electronic device 20. The location of the user 50 is estimated to be a fixed distance d from the location of the hand-held electronic device.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in FIG. 5 may represent steps in a method and/or sections of code in the computer program 16. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

Where a structural feature has been described, it may be replaced by means for performing one or more of the functions of the structural feature whether that function or those functions are explicitly or implicitly described.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

We claim:

1. An apparatus, comprising:
    at least one processor;
    at least one non-transitory memory storing computer program code;
    the at least one memory and the computer program code configured, with the at least one processor, to cause the apparatus to at least:
        determine a location of a hand-held electronic device;
        render visual augmented reality content for display on a display of the hand-held electronic device, based on the location of the hand-held electronic device;
        estimate a location of a user of the hand-held electronic device, different from the location of the hand-held electronic device;
        render aural augmented reality content for output to the user of the hand-held electronic device, based on the location of the user;
        determine that the location of the hand-held electronic device is in a virtual space that is demarcated by a virtual boundary;
        determine that the hand-held electronic device has crossed the virtual boundary without the location of the user crossing the virtual boundary, such that the location of the hand-held electronic device is outside the virtual boundary and the location of the user is inside the virtual boundary; and
        continue to render the aural augmented reality content, associated with the virtual space, for output to the user, based on the location of the user being inside the virtual boundary.

2. The apparatus of claim 1, wherein the at least one memory and the computer program code is configured, with the at least one processor, to further cause the apparatus to at least:
    determine that the location of the user has crossed the virtual boundary, such that the location of the user is outside the virtual boundary; and
    alter or cease the rendering of the aural augmented reality content in response to determining that the user has crossed the virtual boundary.

3. The apparatus of claim 2, wherein altering the rendering of the aural augmented reality content comprises:
    transitioning, from an audio signal emanating from a virtual source in the virtual space being output to the user, to that audio signal no longer being output to the user or that audio signal being output to the user at a lower volume.

4. The apparatus of claim 1, wherein the aural augmented reality content rendered based on the location of the user is output simultaneously with display of the visual augmented reality content rendered based on the location of the hand-held electronic device.

5. The apparatus of claim 1, wherein the aural augmented reality content is output to the user via the hand-held electronic device.

6. The apparatus of any of claim 1, wherein the location of the user is estimated based at least in part on the location of the hand-held electronic device.

7. The apparatus of claim 1, wherein the location of the user is estimated at least in part based on an assumption that the location of the user is a fixed distance from the location of the hand-held electronic device.

8. The apparatus of claim 1, wherein the location of the user is estimated at least in part by sensing the location of the user.

9. The apparatus of claim 8, wherein the location of the user is estimated by analyzing visual data of the user provided by the hand-held electronic device.

10. The apparatus of claim 1, wherein the at least one memory and the computer program code is configured, with the at least one processor, to further cause the apparatus to at least:
    transition, based at least in part on user step detection, from rendering the aural augmented reality content based on the location of the user to rendering the aural augmented reality content based on the location of the hand-held electronic device.

11. The apparatus of claim 10, wherein the user step detection is based on inputs provided from at least one motion sensor of the hand-held electronic device.

12. The apparatus of any of claim 1, wherein the apparatus is the hand-held electronic device.

13. A method, comprising:
    determining a location of a hand-held electronic device;
    rendering visual augmented reality content for display on a display of the hand-held electronic device, based on the location of the hand-held electronic device;
    estimating a location of a user of the hand-held electronic device, different from the location of the hand-held electronic device;
    rendering aural augmented reality content for output to the user of the hand-held electronic device, based on the location of the user;
    determining that the location of the hand-held electronic device is in a virtual space that is demarcated by a virtual boundary;
    determining that the hand-held electronic device has crossed the virtual boundary without the location of the user crossing the virtual boundary, such that the location of the hand-held electronic device is outside the virtual boundary and the location of the user is inside the virtual boundary; and
    continuing to render the aural augmented reality content, associated with the virtual space, for output to the user, based on the location of the user being inside the virtual boundary.

14. The method of claim 13, further comprising:
    determining that the location of the user has crossed the virtual boundary, such that the location of the user is outside the virtual boundary; and
    altering or ceasing the rendering of the aural augmented reality content in response to determining that the user has crossed the virtual boundary.

15. The method of claim 14, wherein altering the rendering of aural augmented reality content comprises:
    transitioning, from an audio signal emanating from a virtual source in the virtual space being output to the user, to that audio signal no longer being output to the user or that audio signal being output to the user at a lower volume.

16. The method of claim 13, further comprising:
    transitioning, based at least in part on user step detection, from rendering the aural augmented reality content based on the location of the user to rendering the aural augmented reality content based on the location of the hand-held electronic device.

17. A non-transitory computer-readable medium comprising computer program code that, when executed by at least one processor of an apparatus, causes the at least one processor at least to:
    determine a location of a hand-held electronic device;
    render visual augmented reality content for display on a display of the hand-held electronic device, based on the location of the hand-held electronic device;
    estimate a location of a user of the hand-held electronic device, different from the location of the hand-held electronic device;
    cause rendering of aural augmented reality content for output to the user of the hand-held electronic device, based on the location of the user;
    determine that the location of the hand-held electronic device is in a virtual space that is demarcated by a virtual boundary;
    determine that the hand-held electronic device has crossed the virtual boundary without the location of the user crossing the virtual boundary, such that the location of the hand-held electronic device is outside the virtual boundary and the location of the user is inside the virtual boundary; and
    continue to cause rendering of the aural augmented reality content, associated with the virtual space, for output to the user, based on the location of the user being inside the virtual boundary.

* * * * *